(12) United States Patent
Taomoto et al.

(10) Patent No.: US 9,834,453 B2
(45) Date of Patent: Dec. 5, 2017

(54) DESALINATION APPARATUS AND DESALINATION METHOD

(71) Applicant: Panasonic Intellectual Property Management Co., Ltd., Osaka (JP)

(72) Inventors: Akira Taomoto, Kyoto (JP); Morio Tomiyama, Nara (JP); Hisaaki Gyoten, Osaka (JP); Norihisa Mino, Osaka (JP); Atsushi Ono, Kyoto (JP); Stephen William John, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 506 days.

(21) Appl. No.: 14/531,019

(22) Filed: Nov. 3, 2014

(65) Prior Publication Data

US 2015/0047966 A1 Feb. 19, 2015

Related U.S. Application Data

(63) Continuation of application No. PCT/JP2014/001409, filed on Mar. 12, 2014.

(30) Foreign Application Priority Data

Mar. 18, 2013 (JP) .................. 2013-055653

(51) Int. Cl.
*C02F 1/04* (2006.01)
*B01D 1/00* (2006.01)
*C02F 103/08* (2006.01)

(52) U.S. Cl.
CPC ............. *C02F 1/04* (2013.01); *B01D 1/00* (2013.01); *C02F 1/043* (2013.01); *C02F 2103/08* (2013.01)

(58) Field of Classification Search
CPC ........ C02F 1/04; C02F 1/043; C02F 2103/08; B01D 1/00
See application file for complete search history.

(56) References Cited

U.S. PATENT DOCUMENTS

| 5,270,080 A | 12/1993 | Mino et al. |
| 8,652,303 B2 | 2/2014 | Mino et al. |
| 2012/0138448 A1 | 6/2012 | Mino et al. |

FOREIGN PATENT DOCUMENTS

| JP | 60-13206 | 1/1985 |
| JP | 7-63670 | 7/1995 |
| WO | 2012/060036 | 5/2012 |

OTHER PUBLICATIONS

Curran, J.C. et al (2010). Proceedings of the 2nd Joint Federal Interagency Conference on Sedimentation and Hydrologic Modeling, Jun. 27-Jul. 1, 2010, Las Vegas, NV, 12 pages.*

(Continued)

*Primary Examiner* — Brian McCaig
(74) *Attorney, Agent, or Firm* — Wenderoth, Lind & Ponack, L.L.P.

(57) ABSTRACT

The desalination apparatus according to the present disclosure includes: a water-repellent particle layer that is located below a water tank, contains water-repellent particles, and allows passage of water vapor generated by evaporation of the liquid stored in the water tank, the water tank being a space for storing the liquid; and a liquefying layer that is located below the water-repellent particle layer, and liquefies the water vapor that has passed through the water-repellent particle layer to obtain the fresh water. The water-repellent particle layer includes an anti-migration layer provided as a surface layer that faces the water tank and containing anti-migration particles. Each of the anti-migration particles has a higher aspect ratio than the water-repellent particles, the aspect ratio being a value obtained by (Continued)

dividing a length in a major axis direction by a length in a minor axis direction.

7 Claims, 12 Drawing Sheets

(56) References Cited

OTHER PUBLICATIONS

Hanson, T. et al (2015). Armoring in Gravel Bed Streams, Colorado State University, 20 pages [Office action cites p. 3].*
Wilcock, P.R. et al (2005). Geophysical Research Letters, 32, 4 pages.*
Linsley, Jr. R.K. et al (1975). Hydrology for Engineers, McGraw-Hill, 482 pgs [Office action cites p. 193].*
International Search Report issued in International Application No. PCT/JP2014/001409 dated Apr. 8, 2014.

* cited by examiner

DESALINATION APPARATUS AND DESALINATION METHOD

CROSS REFERENCE TO RELATED APPLICATIONS

This is a continuation application of PCT International Application No. PCT/JP2014/001409 filed on Mar. 12, 2014, designating the United States of America, which is based on and claims priority of Japanese Patent Application No. 2013-055653 filed on Mar. 18, 2013. The entire disclosures of the above-identified applications, including the specifications, drawings and claims are incorporated herein by reference in their entirety.

FIELD

One or more exemplary embodiments disclosed herein relate generally to a desalination apparatus and a desalination method for obtaining fresh water from a liquid.

BACKGROUND

As a technique for generating fresh water at locations where such water is not easily available, the one of generating fresh water from seawater has been known. For example, Patent Literature (PTL) 1 discloses a desalinating method using water-repellent particles.

CITATION LIST

Patent Literature

[PTL 1] WO2012/060036

SUMMARY

Technical Problem

However, in the method mentioned above, there is a possibility that movement of water-repellent particles may reduce the thickness of a part of a water-repellent particle layer, through which seawater may pass, so that the seawater cannot be desalinated.

One non-limiting and exemplary embodiment provides desalination apparatus and a desalination method that reduce the possibility that the desalination cannot be performed.

Solution to Problem

In one general aspect, the techniques disclosed here feature a desalination apparatus that obtains fresh water from a liquid. The desalination apparatus includes: a water-repellent particle layer that is located below a reservoir layer, contains a plurality of water-repellent particles, and allows passage of water vapor generated by evaporation of the liquid stored in the reservoir layer, the reservoir layer being a space for storing the liquid; and a liquefying layer that is located below the water-repellent particle layer, and liquefies the water vapor that has passed through the water-repellent particle layer to obtain the fresh water. The water-repellent particle layer includes an anti-migration layer provided as a surface layer that faces the reservoir layer and containing a plurality of anti-migration particles, and each of the plurality of anti-migration particles has a higher aspect ratio than the plurality of water-repellent particles, the aspect ratio being a value obtained by dividing a length in a major axis direction by a length in a minor axis direction.

It should be noted that these generic aspects or specific aspects serving as a part thereof may be implemented by a system, a method, an integrated circuit, a computer program or a computer-readable recording medium such as a CD-ROM, or by an arbitrary combination of a system, a method, an integrated circuit, a computer program and a recording medium.

General and specific aspect disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The desalination apparatus and the desalination method according to one or more exemplary embodiments or features disclosed herein can alleviate the problem of desalination being impossible.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

In the present description, "water repellency" means a property of rejecting water.
(Underlying Knowledge Forming Basis of the Present Disclosure)

Before the description of an embodiment, the knowledge leading to the present disclosure will be described first with reference to a desalination apparatus in a comparative example.

Figure 1:
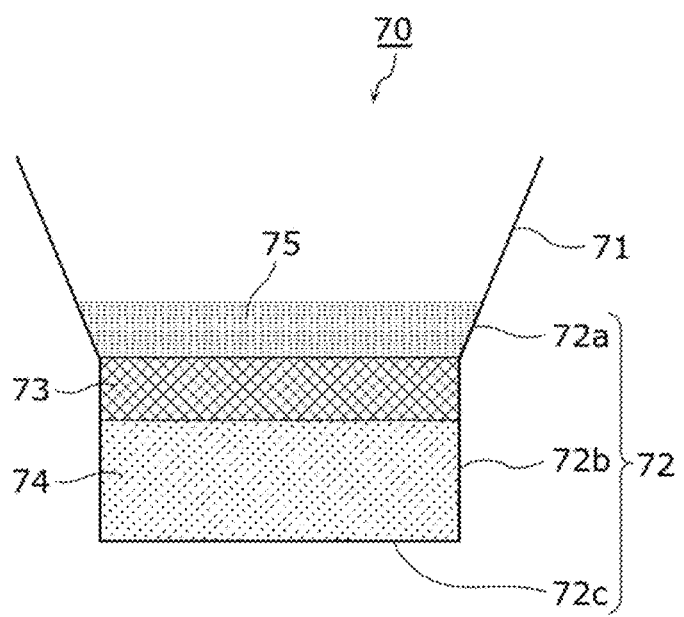
FIG. 1 is a sectional view illustrating a configuration of a desalination apparatus according to a comparative example.

FIG. 1 is a sectional view illustrating a configuration of the desalination apparatus in the comparative example.

A desalination apparatus 70 in the comparative example is a desalination apparatus that obtains fresh water from a liquid, and includes a water tank 71, a water-repellent particle layer 73 and a liquefying layer 74 that are located in this order from above inside a vessel 72 having an upper side wall 72a, a lower side wall 72b and a base plate 72c.

In the desalination apparatus 70, the liquid stored in the water tank 71 (a liquid layer 75) is evaporated, to be water vapor. The water vapor passes through the water-repellent particle layer 73. The water vapor that has passed through the water-repellent particle layer 73 is liquefied in the liquefying layer 14 so as to become water (fresh water).

The water-repellent particle layer 73 is formed of a large number of water-repellent particles that are clustered together. The surface of one water-repellent particle is in contact with the surfaces of other water-repellent particles. Each of the water-repellent particles includes a particle and a water-repellent film coating the particle surface, and has water repellency. Also, between the water-repellent particles that are in contact with each other, the water-repellent particle layer 73 has a gap through which the water vapor obtained by evaporating the liquid can pass.

The inventors have arrived at the following knowledge: in the desalination apparatus 70 described above, during the introduction of a liquid to the water tank 71, the water-repellent particles may sometimes move, so that the surface (upper surface) of the water-repellent particle layer 73 may be partially eroded. FIGS. 2A to 2I are enlarged views illustrating an example of how the surface of the water-repellent particle layer 73 is partially eroded.

<FIG. 2A>

Figure 2A:
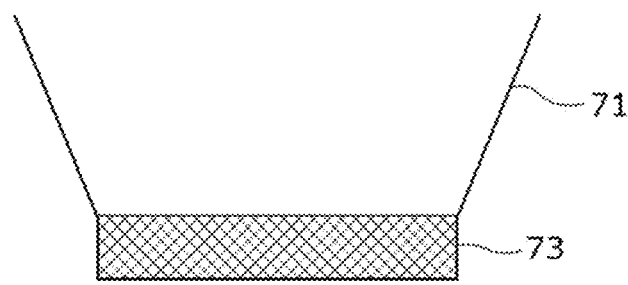
FIG. 2A is a drawing for describing an example of how a surface of a water-repellent particle layer is partially eroded.

FIG. 2A illustrates a state before the introduction of the liquid layer 75 to the water tank 71 in the comparative example. FIG. 2A is a view obtained by enlarging only a part of the water tank 71 and the water-repellent particle layer 73 in the desalination apparatus 70. The following is a description of an example in which the upper surface of the water-repellent particle layer 73 is a flat surface and the liquid layer 75 is introduced from an opening of the water tank 71 along the upper side wall 72a of the water tank 71.

<FIG. 2B>

Figure 2B:
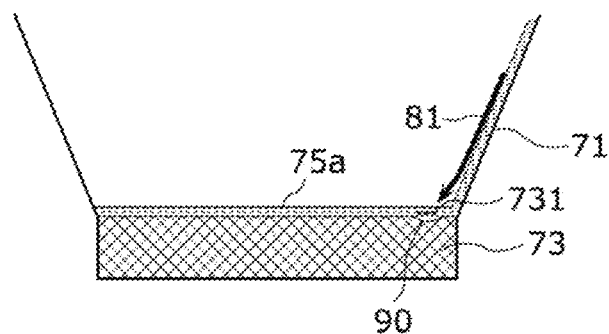
FIG. 2B is a drawing for describing an example of how the surface of the water-repellent particle layer is partially eroded.

FIG. 2B illustrates a state in which, in the state of FIG. 2A, a liquid layer 75a is introduced to the water tank 71 from the opening of the water tank 71 along the upper side wall 72a. The downward arrow indicates a flow 81 of the liquid being introduced. Inside the water tank 71, the liquid that is accumulated in the water tank 71 is illustrated.

By introducing the liquid to the water tank 71, the liquid is accumulated as the liquid layer 75a on the water-repellent particle layer 73. Furthermore, the flow 81 of the introduced liquid causes a part of the water-repellent particles (for example, water-repellent particles 731) in the water-repellent particle layer 73 to be stirred up and suspended in the liquid layer 75a.

In other words, the surface of the water-repellent particle layer 73 near the portion where the liquid has been introduced is partially eroded. The surface of the water-repellent particle layer 73 is partially eroded, so that a recessed portion 90 is formed partially on the surface of the water-repellent particle layer 73. That is to say, a plurality of the water-repellent particles including the water-repellent particles 731 located on the surface of the water-repellent particle layer 73 move, so that the recessed portion 90, which is a dented portion, is formed on the surface of the water-repellent particle layer 73. Also, the water-repellent particles 731 that were located in the portion of the water-repellent particle layer 73 where the recessed portion 90 is formed are stirred up and suspended in the liquid layer 75a.

<FIG. 2C>

Figure 2C:
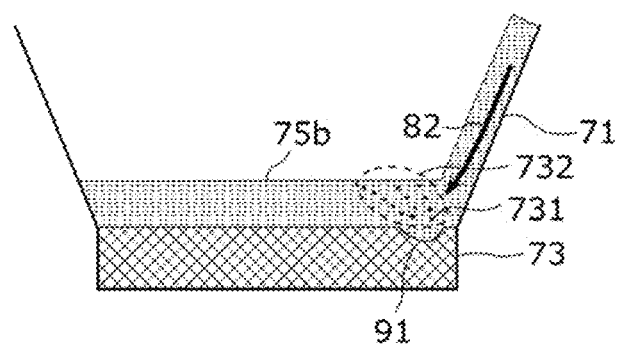
FIG. 2C is a drawing for describing an example of how the surface of the water-repellent particle layer is partially eroded.

FIG. 2C illustrates a state in which, in the state of FIG. 2B, the liquid is introduced to the water tank 71 with a still larger flow amount. A flow 82 of the introduced liquid further erodes the surface of the water-repellent particle layer 73, thus forming a recessed portion 91. With the further introduction of the liquid, the recessed portion 91 becomes deeper than the recessed portion 90. Moreover, the flow 82 of the liquid causes a water-repellent particle group 732 including the water-repellent particles 731 suspended in a liquid layer 75b to mainly move away from the recessed portion 91 within the liquid layer 75b.

<FIG. 2D>

Figure 2D:
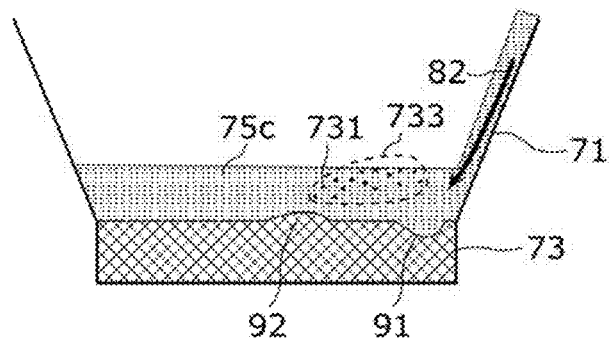
FIG. 2D is a drawing for describing an example of how the surface of the water-repellent particle layer is partially eroded.

FIG. 2D illustrates how a wager-repellent particle group 733 including the water-repellent particles 731 suspended in a liquid layer 75c settles on the surface of the water-repellent particle layer 73 other than the recessed portion 91. With the settlement of the plurality of water-repellent particles, a plurality of protruding portions 92 are partially formed on the surface of the water-repellent particle layer 73 other than the recessed portion 91.

<FIG. 2E>

Figure 2E:
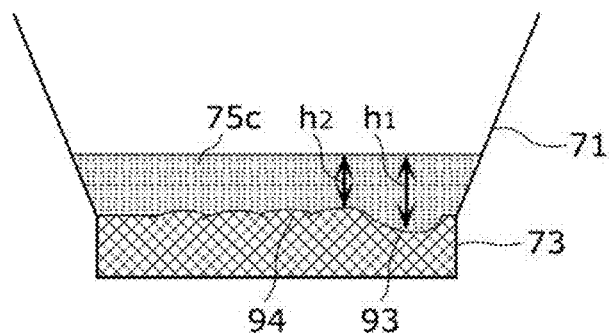
FIG. 2E is a drawing for describing an example of how the ace of the water-repellent particle layer is partially eroded.

FIG. 2E illustrates a state in which the liquid layer 7c is formed having a predetermined height (a height not exceeding water bearing pressure) with reference to the height of the surface of the water-repellent particle layer 73 before erosion. In the state illustrated in FIG. 2E, the introduction of the liquid to the water tank 71 is stopped. By introducing the liquid to the water tank 71 as illustrated in FIGS. 2C and 2D, the water-repellent particle layer 73 is partially eroded, so that a recessed portion 93 and a protruding portion 94 are formed on the surface of the water-repellent particle layer 73. In other words, the height of the upper surface of the water-repellent particle layer 73 is not uniform (the upper surface is not flat) but varies partially because recessed and protruding portions are formed. As a result, the height of the liquid layer 75c varies partially as illustrated by a height h1 of the liquid layer 75c in the recessed portion 93 and a height h2 of the liquid layer 75c in the protruding portion 94.

In other words, for example, during the introduction of the liquid, the liquid flow varies according to the variation of the height of the liquid layer 75c in the water tank 71. Accordingly, the water-repellent particles suspended in the liquid layer 75c settle individually at different positions of the water-repellent particle layer 73, thus forming a plurality of the protruding portions 94.

Thus, as illustrated in FIG. 2E, at least one recessed portion 93 and the plurality of protruding portions 94 could be formed on the surface of the water-repellent particle layer 73. It should be noted that there is no limitation to one recessed portion 93. A plurality of the recessed portions 93 also could be formed on the surface of the water-repellent particle layer 73 depending on the flow of the liquid to be introduced to the water tank 71 or the method for introducing the liquid.

<FIG. 2F>

Next, after the liquid layer 75c is formed as illustrated in FIG. 2E, the desalination apparatus 70 carries out a desalination process of obtaining fresh water by heating the liquid in the liquid layer 75c to obtain water vapor, which passes through the water-repellent particle layer 73 and turns to water in the liquefying layer 74. With the desalination process, the liquid in the liquid layer 75c turns to water vapor and moves from the liquid layer 75c, so that the height of the liquid layer 75c decreases. Thus, as illustrated in FIG. 2F, the liquid is introduced again to the water tank 71 through a flow 83, thereby maintaining the height of a liquid layer 75d.

<FIG. 2G>

Figure 2F:
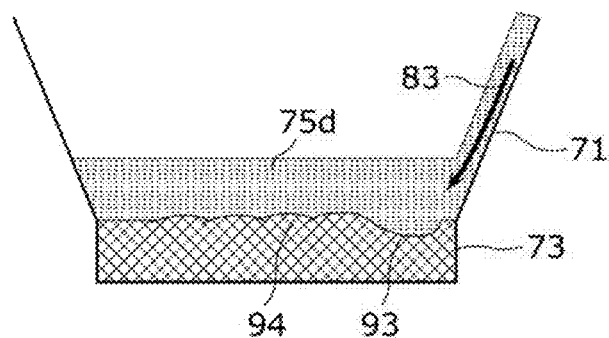
FIG. 2F is a drawing for describing an example of how the surface of the water-repellent particle layer partially eroded.
Figure 2G:
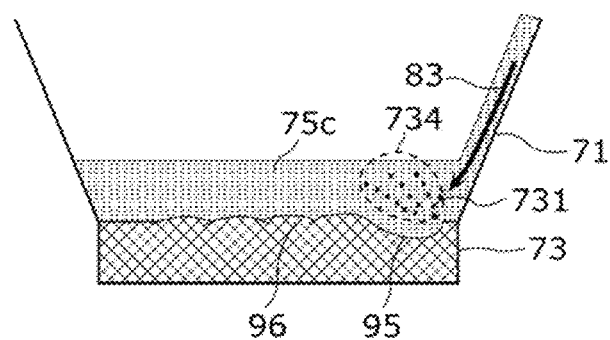
FIG. 2G is a drawing for describing an example of how the surface of the water-repellent particle layer is partially eroded.

As illustrated in FIG. 2F, the reintroduction of the liquid to the water tank 71 causes the surface of the water-repellent particle layer 73 to be partially eroded similarly to FIG. 2C. As illustrated in FIG. 2G, when the liquid is introduced to the water tank 71 from the same position as the state until FIG. 2F, a recessed portion 95 becomes deeper than the recessed portion 93. It should be noted that the flow 83 of the liquid causes a water-repellent particle group 734 including, for example, the water-repellent particles 731 suspended in the liquid layer 75c to move mainly away from the recessed portion 95 within the liquid layer 75c and, for example, settle in a protruding portion 96.

<FIG. 2H>

Figure 2H:
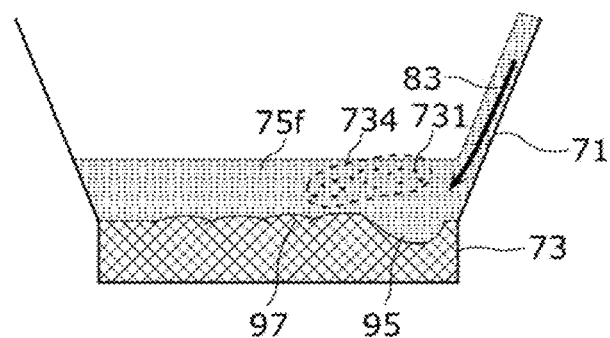
FIG. 2H is a drawing for describing an example of how the surface of the water-repellent particle layer partially eroded.

Next, as illustrated in FIG. 2H, the water-repellent particle group 734 including the water-repellent particles 731 suspended within a liquid layer 75f settles on the surface of the water-repellent particle layer 73, so that a protruding portion 97 is formed on the surface of the water-repellent particle layer 73. Specifically, since a part of the water-repellent particle group 734 settles on the portion where the protruding portion 96 is already formed, the protruding portion 97 is higher than the protruding portion 96.

<FIG. 2I>

As illustrated in FIGS. 2A to 2H, during the formation of the liquid layer 75, the recessed portion and the plurality of protruding portions are formed on the surface of the water-repellent particle layer 73.

Figure 2I:
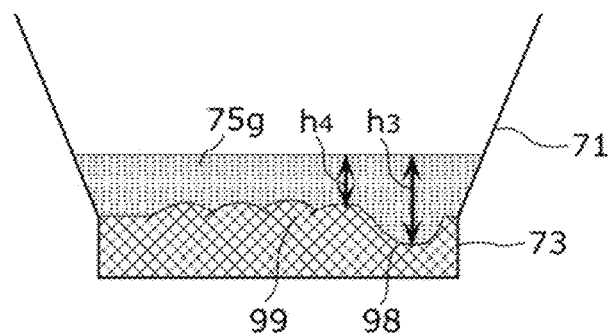
FIG. 2I is a drawing for describing an example of how the surface of the water-repellent particle layer is partially eroded.

Specifically, in FIG. 2I, h3 represents the distance between a lower surface of a recessed portion 98 (for example, the most dented portion) and an upper surface of a liquid layer 75g, and h4 represents the distance between an upper surface of a protruding portion 99 (for example, the most protruding portion) and the upper surface of the liquid layer 75g. Here, the upper surface of the liquid layer 75g (a liquid surface) may also be referred to as a "water surface." As described above, even when the height of the upper surface of the liquid layer 75g (water surface) is the same, the distance h3 between the lower surface of the recessed portion 98 and the water surface is larger than the distance h4 between the upper surface of the protruding portion 99 and the water surface.

The pressure applied to the water-repellent particle layer 73 varies depending on the distance from the water-repellent particle layer 73 to the water surface. Accordingly, the pressure applied to the water-repellent particle layer 73 in the recessed portion 98 is different from that in the protruding portion 99 illustrated in FIG. 2I.

Thus, if the liquid is introduced to the water tank 71 without considering the formation of the recessed portion 98 and the protruding portion 99 on the surface of the water-repellent particle layer 73, the liquid in an amount exceeding the water bearing pressure is introduced in a part of the water-repellent particle layer 73. In this case, the water-repellent particle layer 73 becomes unable to hold the liquid layer 75g, so that the liquid enters the inside of the water-repellent particle layer 73 (the water-repellent particle layer 73 is breached). In the following, the water-repellent particle layer 73 becoming unable to hold the liquid is also referred to as that being "breached."

For example, if the liquid layer 75g is formed on the water-repellent particle layer 73 so as to have a predetermined height (a height not exceeding the water bearing pressure) with reference to the flat surface of the water-repellent particle layer 73 before erosion, pressure greater than or equal to the pressure acting on the referenced flat surface (pressure exceeding the water bearing pressure) is exerted on the recessed portion 98. Consequently, there is a possibility that the water-repellent particle layer 73 could be breached in the recessed portion 98.

Also, as illustrated in FIGS. 2F to 2H, even if the liquid is introduced so as to form the liquid layer 75 as thick as the liquid layer 75 before the desalination process, a portion of the water-repellent particle layer 73 is eroded, and pressure applied to that portion of the water-repellent particle layer 73 (for example, the recessed portion 98) exceeds a predetermined water bearing pressure. Thus, there is a possibility that the eroded portion of the water-repellent particle layer 73 (for example, the recessed portion 98) could be beached.

Every time the desalination process is carried out, the liquid in the liquid layer 7 is evaporated, making it necessary to introduce the liquid to the water tank 71. By introducing the liquid again after the desalination process as illustrated in FIG. 2F, the recessed portion (for example, the recessed portion 93) is increasingly deeper. In other words, the distance h3 between the lower surface of the recessed portion 98 and the upper surface of the liquid layer 75g illustrated in FIG. 2I continues increasing unless the water-repellent particles are supplied to the recessed portion 98 of the water-repellent particle layer 73 for repairing.

The water bearing pressure of the water-repellent particle layer 73 is determined by the height from the surface of the water-repellent particle layer 73 to the upper surface of the liquid layer 75 as described above. Accordingly, the deepening of the eroded portion (recessed portion) of the water-repellent particle layer 73 may cause the water-repellent particle layer 73 to be breached unless the height of the liquid layer 75 is adjusted to be smaller.

As described above, in the desalination apparatus in the comparative example, the inventors have found that the water-repellent particle layer 73 formed of the plurality of water-repellent particles has a layer structure that is more easily deformed by the movement of the water-repellent particles due to an applied force, compared with a particle layer formed of a plurality of hydrophilic particles.

In the water-repellent particle layer 73 formed of the plurality of water-repellent particles, the adjacent particles are bound to each other more weakly than those in the particle layer formed of the plurality of hydrophilic particles. Adjacent hydrophilic particles are usually bound to one another via a water molecule. In contrast, adjacent water-repellent particles are merely in contact with one another, and easily movable by an applied force. Thus, when a force is applied to a portion of the water-repellent particle layer 73, the water-repellent particles subjected to the force move, whereas the other water-repellent particles subjected to no force do not move. Consequently, the water-repellent particle layer 73 is easily deformed.

Here, the amount of the liquid that can be held above the upper surface of the water-repellent particle layer 73 is determined by the water bearing pressure, which depends on the height of the liquid surface from the surface (upper surface) of the water-repellent particle layer 73. When the liquid in an amount exceeding the predetermined water bearing pressure of the water-repellent particle layer 73 is placed (formed) above the water-repellent particle layer 73, the liquid passes through the water-repellent particle layer 73. In other words, the water-repellent particle layer 73 becomes unable to hold the liquid any more and lets the liquid pass therethrough. When the liquid layer 75 is formed above the water-repellent particle layer 73, it is appropriate to suppress the deformation of the water-repellent particle layer 73 because the surface deformation of the water-repellent particle layer 73 brings about the change in height of the water surface from the surface of the water-repellent particle layer 73.

In view of the above, the inventors have come to an inventive concept that can suppress the movement of the water-repellent particles for the purpose of preventing the water-repellent particle layer 73 from being breached.

According to an exemplary embodiment disclosed herein, a desalination apparatus obtains fresh water from a liquid, the desalination apparatus including: a water-repellent particle layer that is located below a reservoir layer, contains a plurality of water-repellent particles, and allows passage of water vapor generated by evaporation of the liquid stored in the reservoir layer, the reservoir layer being a space for storing the liquid; and a liquefying layer that is located below the water-repellent particle layer, and liquefies the water vapor that has passed through the water-repellent particle layer to obtain the fresh water. The water-repellent particle layer includes an anti-migration layer provided as a surface layer that faces the reservoir layer and containing a plurality of anti-migration particles, and each of the plurality of anti-migration particles has a higher aspect ratio than the plurality of water-repellent particles, the aspect ratio being a value obtained by dividing a length in a major axis direction by a length in a minor axis direction.

Since the aspect ratio of the anti-migration particles is higher than the aspect ratio of the water-repellent particles as described above, the anti-migration particles move less easily than the water-repellent particles. Also, the anti-migration particles serve as an obstacle to easy movement of the water-repellent particles. As a result, the anti-migration layer, namely, a surface layer of the water-repellent particle layer is not eroded easily. In other words, no recessed portion is formed easily in the water-repellent particle layer. Unless the recessed portion is formed, it is possible to prevent the water-repellent particles located inside the water-repellent particle layer from being stirred up in the liquid stored in the reservoir layer. This can prevent the water-repellent particle layer from being breached. Consequently, the problem of desalination being impossible can be alleviated.

For example, the liquid may contain water and impurities dissolved in the water, and a specific gravity of each of the plurality of anti-migration particles may be greater than a specific gravity of the liquid measured when a concentration of the impurities in the liquid is at a saturation concentration, and less than or equal to a specific gravity of the plurality of water-repellent particles.

Since the specific gravity of the anti-migration particles is greater than the specific gravity of the liquid measured when the impurity concentration is at the saturation concentration as described above, the anti-migration particles can be suspended less easily in the liquid stored in the reservoir layer. Also, the specific gravity of the anti-migration particles is brought to less than or equal to the specific gravity of the water-repellent particles, so that the anti-migration particles can get into the water-repellent particle layer less easily.

In other words, the specific gravity of the anti-migration particles is made greater than the specific gravity of the liquid measured when the impurity concentration is at the saturation concentration, and less than or equal to the specific gravity of the water-repellent particles, whereby it becomes easier to hold the anti-migration particles in the surface layer of the water-repellent particle layer, leading to further suppression of the movement of the water-repellent particles.

For example each of the plurality of anti-migration particles may be hydrophilic.

This makes the anti-migration particles even less easily movable, and suppresses the decrease in desalination efficiency.

For example, in a plan view, the plurality of anti-migration particles may occupy 10% to 50% per unit area of the anti-migration layer.

This suppresses both the decrease in desalination efficiency and the movement of the water-repellent particles in a sufficient manner.

For example, the length of each of the plurality of anti-migration particles in the minor axis direction may be greater than an average particle size of the plurality of water-repellent particles.

This makes it possible to prevent the water-repellent particles from moving by climbing over the anti-migration particles. Also, by taking out at least a part of the water-repellent particle layer including the anti-migration layer and passing it through a sieve, it is possible to easily separate the water-repellent particles and the anti-migration particles contained in the water-repellent particle layer that has been taken out.

It should be appreciated that these generic or specific aspects may be implemented as a desalination method that uses the desalination apparatus described above to obtain fresh water from a liquid.

The following is a specific description of each embodiment, with reference to the accompanying drawings.

It should be noted that any embodiment described below will illustrate a generic or specific example. The numerical values, shapes, materials, structural components, the arrangement of the structural components, steps and the order of the steps mentioned in the following embodiment are merely an example and not intended to limit the present disclosure. Further, among the structural components in the following embodiment, the one that is not recited in any independent claim exhibiting the most generic concept will be described as an arbitrary structural component.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and, connection of the structural elements, steps, the processing order of the steps etc, shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

EMBODIMENT

[Desalination Apparatus]

Figure 3:
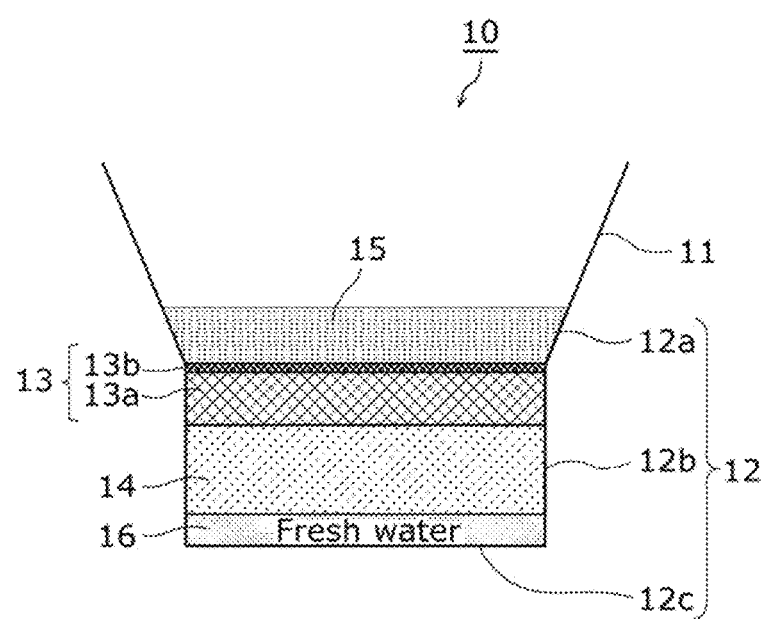
FIG. 3 is a sectional view illustrating a configuration desalination apparatus according to an embodiment.

The following describes a desalination apparatus 10 with a basic configuration and a desalination process thereof with reference to the drawings before describing a desalination system according to an embodiment. FIG. 3 is a sectional view illustrating a configuration of the desalination apparatus 10.

The desalination apparatus 10 shown in FIG. 3 includes a water tank 11, a water-repellent particle layer 13 and a liquefying layer 14. The water tank 11, the water-repellent particle layer 13 and the liquefying layer 14 are located in this order from above. Here, the water tank 11 has a lateral surface surrounded by an upper side wall 12a of a vessel 12 and a bottom surface covered with the water-repellent particle layer 13, such that a space for storing a liquid (a reservoir layer) is defined therein.

<Water Tank 11>

The water tank 11 may have any shape such as a rectangle or a circle when seen in a plan view (a top view). The lateral surface of the water tank 11 is formed of the upper side wall 12a of the vessel 12, and the bottom surface thereof is formed of an upper surface of the water-repellent particle layer 13.

Here, the vessel 12 will be described. The vessel 12 shown in FIG. 3 includes a lower side wall 12b that extends vertically, the upper side wall 12a that is connected to the lower side wall 12b and inclined so as to expand upwardly, and a base plate 12c that is connected to the lower side wall 12b. The upper side wall 12a is not necessarily inclined so as to expand upwardly, but may extend vertically similarly to the lower side wall 12b. However, since the upper side wall 12a sometimes corresponds to a flow channel of a liquid when the liquid is introduced to the water tank 11, it is favorable that the upper side wall 12a be inclined so as to expand upwardly in order to reduce energy of the liquid to be introduced to the water tank 11.

The vessel 12 is formed such that the upper side wall 12a, the lower side wall 12b and the base plate 12c surround surfaces other than an upper surface of the water tank 11.

In a lower portion of the vessel 12, lateral portions of the water-repellent particle layer 13 and the liquefying layer 14 described later are entirely surrounded by the lower side wall 12b, and a bottom surface of the liquefying layer 14 is held by the base plate 12c. The vessel 12 allows fresh water obtained by desalination to be held in the liquefying layer 14.

Each of the lower side wall 12b and the upper side wall 12a is formed of a water repellent material. An exemplary material for each of the lower side wall 12b and the upper side wall 12a is a metal sheet, concrete, a waterproof sheet or clay.

As described above, the vessel 12 has a shape of a bottomed tube, includes the upper side wall 12a that has a tubular shape whose upper opening is larger than its lower opening, the lower side wall 12b that has a tubular shape whose upper opening contacts the lower opening of the upper side wall 12a, and the base plate 12c that closes a lower opening of the lower side wall 12b, and receives the water tank 11, the water-repellent particle layer 13 and the liquefying layer 14 therein. Incidentally, the vessel 12 is not limited to the shape of a bottomed tube, but may be provided, for example, as a recessed portion dug in the ground, in which the water tank 11, the water-repellent particle layer 13 and the liquefying layer 14 are located. Also, the lower side wall 12b and the upper side wall 12a are not limited to have a water repellency but may have a water proof property.

The liquid poured (introduced) into the water tank 11 forms the liquid layer 15 in the water tank 11. In other words, the liquid forms the liquid layer 15 above the upper surface of the water-repellent particle layer 13 and inside the vessel 12 (a space surrounded by the upper side wall 12a).

It is noted that the desalination apparatus 10 may have an introduction passage for introducing the liquid to the water tank 11. On the other hand, when the desalination apparatus 10 does not have the introduction passage, the liquid may be introduced into the water tank 11 from an opening of the water tank 11 (an opening of the vessel 12). Here, the liquid to be introduced to the water tank 11 is transparent or translucent, for example.

The liquid that has been poured into the water tank 11 and formed the liquid layer 15 does not fall down to the liquefying layer 14 because the water-repellent particle layer 13 and the upper side wall 12a have water repellency. In other words, the liquid that has been poured into the water tank 11 is overlaid on the upper surface of the water-repellent particle layer 13 whose perimeter is surrounded by the upper side wall 12a, and maintained as the liquid layer 15. The height of the liquid layer 15 (a liquid level of the liquid layer 15) is, for example, 1 mm to 50 cm. When the height of the liquid layer 15 is too great (for example, larger than 50 cm), it takes time to heat the liquid as described later. Thus, a great amount of heat capacity is needed, resulting in decreased efficiency of desalinating the liquid. On the other hand, when the height of the liquid layer 15 is too small (for example, smaller than 1 mm), the efficiency of desalinating the liquid is excessively reduced. Accordingly, the height of the liquid layer 15 within the above-noted numerical range makes it possible to keep an appropriate desalination efficiency.

As described above, the lateral surface of the water tank 11 is formed of the upper side wall 12a of the vessel, and the bottom surface thereof is formed of the water-repellent particle layer 13. The water tank 11 holds as the liquid layer 15 the liquid that has been introduced from an outside of the desalination apparatus 10.

It should be noted that the water tank 11 may include a heater for heating the liquid layer 15 in the water tank 11. In this case, the heater is disposed on the upper side wall 12a of the water tank 11, for example.

<Water-Repellent Particle Layer 13>

The water-repellent particle layer 13 is located below the water tank 11. The upper surface of the water-repellent particle layer 13 forms the bottom surface of the water tank 11. When the liquid is poured into the water tank 11, the water-repellent particle layer 13 is located in contact with, the lower surface of the liquid layer 15. As shown in FIG. 3, a lateral surface of the water-repellent particle layer 13 may be surrounded by the lower side wall 12b.

The water-repellent particle layer 13 contains at least a plurality of water-repellent particles. Each of the water-repellent particles includes a particle and a water-repellent film that coats a particle surface. The water-repellent particles are particles whose surfaces have water repellency.

The water-repellent particle layer 13 is formed of a large number of the water-repellent particles that are clustered together. In other words, the surface of one water-repellent particle is in contact with the surfaces of other water-repellent particles. At this time, between the water-repellent particles that are in contact with each other, the water-repellent particle layer 13 has a gap through which the water vapor obtained by heating, and evaporating the liquid can pass. Since the water-repellent particle layer 13 includes the plurality of water-repellent particles, it is possible to reduce the liquid entering the inside of the water-repellent particle layer 13.

The lower side wall 12b may surround the lateral surface of the water-repellent particle layer 13 entirely. By doing so, it becomes possible to reduce the liquid entering the inside of the water-repellent particle layer 13. Since the plurality of water-repellent particles forming the water-repellent particle layer 13 have water repellency and thus can reduce the liquid entering the inside of the water-repellent particle layer 13, it is not essential to provide the lower side wall 12b.

The particles include gravel, sand, silt and clay. The gravel corresponds to particles having a particle size of greater than 2 mm and not greater than 75 mm. The sand corresponds to particles having a particle size of greater than 0.075 mm and not greater than 2 mm. The silt corresponds to particles having a particle size of greater than 0.005 mm and not greater than 0.075 mm. The clay corresponds to particles having a particle size of not greater than 0.005 mm.

The water-repellent film coats the surface of each of the particles. The water-repellent film may include a fluorocarbon group represented by the chemical formula $-(CF_2)_n-$. Here, n is a natural number. For example, n ranges from 2 to 20.

The water-repellent film may be bound to the particle by a covalent bond. The following chemical formula (I) represents a favorable water-repellent film.

[Formula 1]

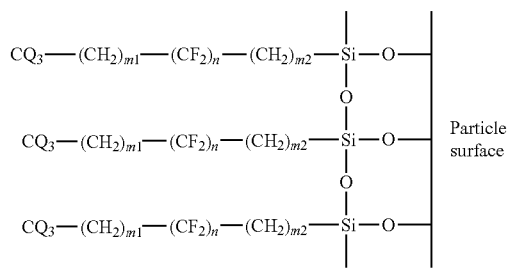

(I)

Here, Q represents hydrogen or fluorine, m1 and m2 represent zero or a natural number of not less than one, independently. Further, n ranges from 2 to 20.

In the following, an exemplary method for producing the water-repellent particles will be described.

First, a surfactant represented by the chemical formula $CX_3-(CH_2)_{m1}-(CF_2)_n-(CH_2)_{m2}-SiX_3$ is dissolved in a non-aqueous solvent to prepare a surfactant solution, X is halogen, optionally, chlorine.

Next, a plurality of particles are immersed in the surfactant solution in dry atmosphere to obtain a plurality of water-repellent particles (see Patent Literature: U.S. Pat. No. 5,270,080 (corresponding to Japanese Examined Patent Application Publication No. 07-063670)).

Furthermore, examples of the material for the water-repellent film include chlorosilane materials or alkoxysilane materials. The chlorosilane materials are, for example, heptadecafluoro-1,1,2,2-tetrahydrodecyltrichlorosilane or n-octadecyldimethylchlorosilane. The alkoxysilane materials are, for example, n-octadecyltrimethoxysilane or nonafluorohexyltriethoxysilane.

The water-repellent particle layer 13 may have low thermal conductivity so that heat conduction between the water tank 11 and the liquefying layer 14 is reduced. In the water tank 11, the liquid is heated and evaporated. Accordingly, the water tank 11 is kept at a predetermined temperature or higher (for example, from 40° C. to 80° C.). The liquefying layer 14 liquefies the water vapor. Accordingly, the liquefying layer 14 is kept at a predetermined temperature or lower (for example, 30° C. or lower). The difference in temperature between the water tank 11 and the liquefying layer 14 is at least 10° C. When the difference in temperature between the water tank 11 and the liquefying layer 14 is considerable and the thermal conductivity therebetween is high, the desalination efficiency may be reduced in some cases.

Since the water-repellent particle layer 13 is formed of the plurality of water-repellent particles that are clustered together, air is present between the plurality of particles. Thus, the water-repellent particle layer 13 has lower thermal conductivity than a film or the like formed of a uniform material.

The thickness of the water-repellent particle layer 13 is, for example, from 5 mm to 30 cm.

When the water-repellent particle layer 13 is too thin (e.g., has a thickness of less than 5 mm), there is a possibility that the water poured in the water tank 11 may fall down to the liquefying layer 14. On the other hand, the water-repellent particle layer 13 is too thick (e.g., has a thickness of greater than 30 cm), the water vapor described later cannot easily pass through the gap between particles in the water-repellent particle layer 13.

<Liquefying Layer 14>

The liquefying layer 14 is located below the water-repellent particle layer 13. The liquefying layer 14 may be formed of a plurality of particles including particles that have not been treated to be water repellent. Alternatively, the liquefying layer 14 may be a space surrounded by the lower side wall 12b and the base plate 12c.

The lateral portion of the liquefying layer 14 may be entirely surrounded by the lower side wall 12b and the bottom portion thereof may be covered with the base plate 12c, so that the vessel 12 can hold fresh water 16.

The water vapor that has left the water-repellent particle layer 13 and reached the liquefying layer 14 after passing through the gap between the particles in the water-repellent particle layer 13 is liquefied in the liquefying layer 14 to become liquid water (fresh water 16). Details will be described later.

The liquefying layer 14 is cooled as necessary.

An exemplary cooling method is illustrated as follows. The liquefying layer 14 is cooled by placing at least a part of the liquefying layer 14 in the soil (in the ground). For example, the height of the interface between the liquefying layer 14 and the water-repellent particle layer 13 is brought to the same level as the earth's surface, thereby making the temperature of the liquefying layer 14 lower than that of the water-repellent particle layer 13.

Also, the liquefying layer 14 may include a cooling unit.

As described above, the liquefying layer 14 is located immediately below the water-repellent particle layer 13, and liquefies by cooling the water vapor that has passed through the water-repellent particle layer 13. Here, the liquefying layer 14 is kept at a predetermined temperature or lower (for example, 15° C. or lower).

It should be noted that, at the interface between the liquefying layer 14 and the water-repellent particle layer 13, the desalination apparatus 10 may include a support layer such as a mesh, for example, for avoiding easy falling of the water-repellent particles in the water-repellent particle layer down to the liquefying layer 14.

[Characteristic Configuration of Desalination Apparatus]

In the following, the characteristic configuration of the desalination apparatus according to the present embodiment and its variation will be described, with reference to the accompanying drawings.

As illustrated in FIG. 3, in the desalination apparatus 10 according to the present embodiment, the water-repellent particle layer 13 includes a lower particle layer 13a and an anti-migration layer 13b.

The lower particle layer 13a is located at a lower side in the water-repellent particle layer 13, and contains a plurality of water-repellent particles. In other words, a gap through which water vapor passes and the liquid does not pass is formed between adjacent ones of the plurality of water-repellent particles. Accordingly, the lower particle layer 13a does not allow passage of the liquid and allows passage of the water vapor generated by evaporation of the liquid.

The anti-migration layer 13b is provided as the surface layer of the water-repellent particle layer 13, and includes a plurality of water-repellent particles and a plurality of anti-migration particles. The aspect ratio of each of the anti-migration particles is higher than the aspect ratio of each of the water-repellent particles. In the present description, the aspect ratio means a value obtained by dividing the length in a major axis direction by that in a minor axis direction or a ratio of the former to the latter.

Figure 4:
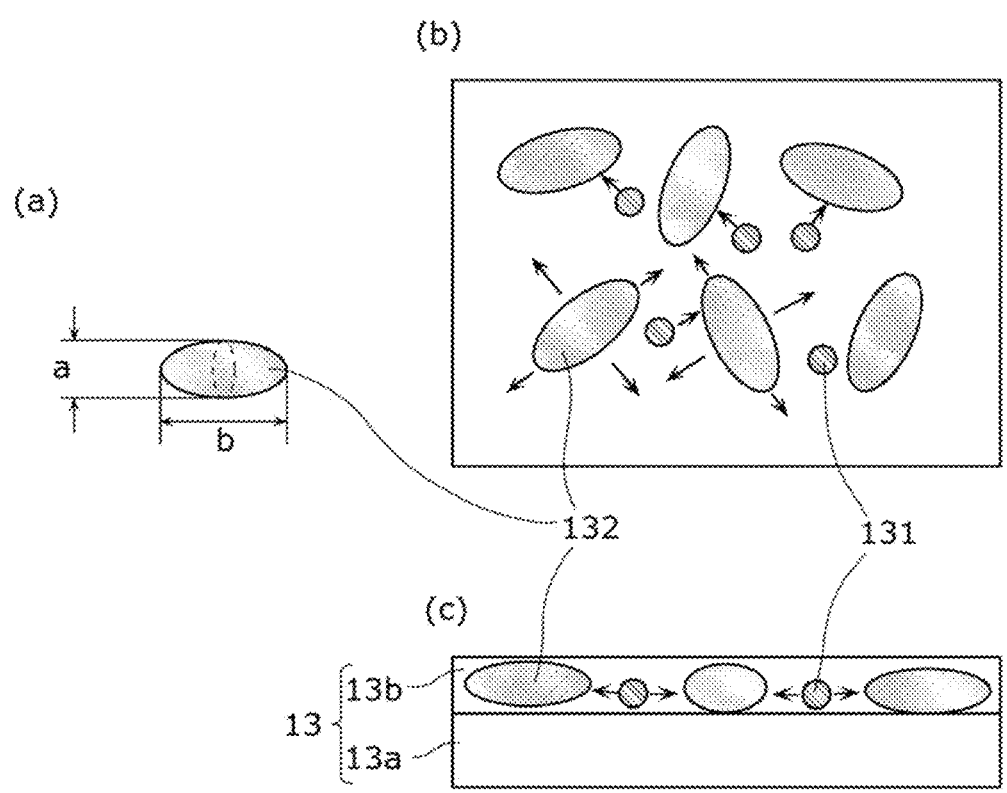
FIG. 4 illustrates a detailed configuration of an anti-migration layer in an embodiment.

(a) to (c) in FIG. 4 illustrate a detailed configuration of the anti-migration layer 13b in an embodiment. (a) in FIG. 4 is a perspective view illustrating the structure of the anti-migration particle contained in the anti-migration layer 13b. (b) in FIG. 4 is a plan view illustrating the anti-migration layer 13b. (c) in FIG. 4 is a sectional view illustrating the anti-migration layer 13b. It is noted that (c) in FIG. 4 also illustrates a part of the lower particle layer 13a. However, the individual water-repellent particles contained in the lower particle layer 13a are omitted in this figure.

As illustrated in (c) of FIG. 4, the water-repellent particle layer 13 includes as the surface layer the anti-migration layer 13b containing anti-migration particles 132. More specifically, the anti-migration layer 13b has the anti-migration particles 132 and the water-repellent particles 131 that are mixed together. In this way, in the anti-migration layer 13b, the anti-migration particles 132 serve as an obstacle to easy movement of the water-repellent particles 131. As a result, the anti-migration layer 13b, namely, the surface layer of the water-repellent particle layer 13 is not eroded easily. In other words, no recessed portion is formed easily in the water-repellent particle layer 13. Since the formation of the recessed portion can be suppressed, it is possible to prevent the water-repellent particle layer 13 from being breached.

The following is a detailed description of the anti-migration particles 132.

The aspect ratio of the anti-migration particles 132 is higher than the aspect ratio of the water-repellent particles 131. For example, the length of the anti-migration particle 132 in the minor axis direction is greater than 200 μm and less than or equal to 2 mm, whereas the length of the anti-migration particle 132 in the major axis direction is from 1 mm to 10 mm.

Also, it is favorable that the length of the anti-migration particle 132 in the major axis direction be greater than that of the water-repellent particle 131 by at least a predetermined length. For example, the former is at least twice as great as the latter. Details will be described later.

The anti-migration particles 132 are formed of, for example, a glass fiber, a metal wire or the like. The anti-migration particles 132 can be produced artificially. Here, producing artificially means breaking or pulverizing naturally occurring raw materials (for example, stones or minerals, etc.) to achieve a desired shape. Alternatively, it means heat-treating and chemically treating naturally occurring raw materials to extract a desired material (for example, ceramics or resins, etc.) and breaking or pulverizing the desired material to achieve a desired shape.

However, it is favorable that the anti-migration particles 132 be produced by heat-treating or chemically treating naturally occurring raw materials to extract a desired material and breaking or pulverizing the desired material. In this way, the individual anti-migration particles 132 have a uniform property regardless of composition variations of the naturally occurring raw materials. Furthermore, it becomes easier to produce the anti-migration particles 132 having a desired property.

Since the aspect ratio of the anti-migration particles 132 is higher than the aspect ratio of the water-repellent particles 131 as described above, it is possible to prevent the water-repellent particle layer 13 from being breached. This will be described by way of a comparative example. The comparative example is directed to an anti-migration layer containing anti-migration particles having substantially the same aspect ratio as the water-repellent particles 131.

Figure 5:
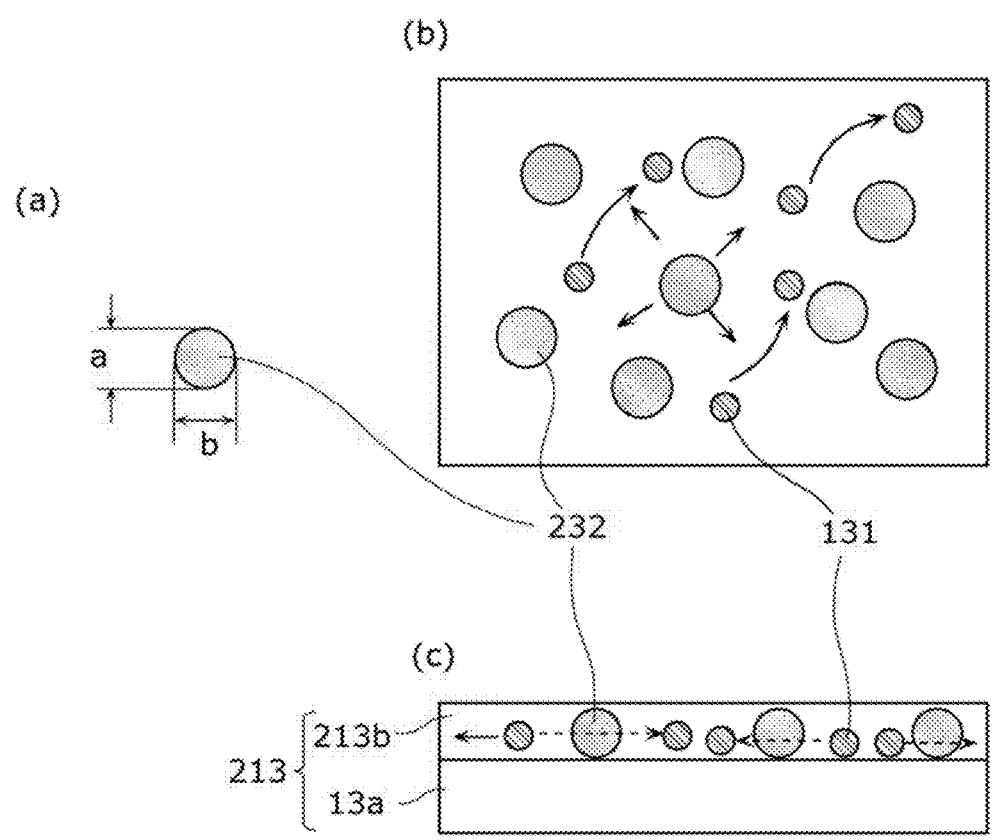
FIG. 5 illustrates a detailed configuration of an anti-migration layer in a comparative example.

(a) to (c) in FIG. 5 illustrate a detailed configuration of the anti-migration layer in the comparative example. (a) in FIG. 5 is a perspective view illustrating the structure of an anti-migration particle 232 contained in an anti-migration layer 213b. (b) in FIG. 5 is a plan view illustrating the anti-migration layer 213b. (c) in FIG. 5 is a sectional view illustrating the anti-migration layer 213b. It is noted that (c) in FIG. 5 also illustrates a part of the lower particle layer 13a. However, the individual water-repellent particles contained in the lower particle layer 13a are omitted in this figure.

The anti-migration particle 232 illustrated in (a) of FIG. 5 has a length b in the major axis direction and a length a in the minor axis direction. Although the length b and the length a illustrated in (a) of FIG. 5 are expressed as the length b in the major axis direction and the length a in the minor axis direction, they are substantially equal to each other. In other words, the anti-migration particle 232 illustrated in (a) of FIG. 5 has an aspect ratio (b/a) of substantially one.

The aspect ratio of the water-repellent particles 131 illustrated in (b) and (c) of FIG. 5 is substantially one, similarly to the aspect ratio of the anti-migration particles 232. In this case, the anti-migration particles 232 roll easily in both of the major axis direction and the minor axis direction in (a) of FIG. 5. When the aspect ratio of these particles is close to one, how easy the particles roll is less dependent on directions.

Thus, when the water-repellent particle 131 moves and makes contact with the anti-migration particle 232, the anti-migration particle 232 cannot stop the movement of the water-repellent particle 131, so that the anti-migration particle 232 and the water-repellent particle 131 move together. Consequently, the water-repellent particles 131 in the anti-migration layer 213b move, resulting in the formation of a recessed portion in the anti-migration layer 213b. In the comparative example having the water-repellent particle layer 213 including the anti-migration layer 213b, it is likely that breaching occurs.

In contrast to the comparative example, the aspect ratio (the value b/a obtained by dividing the length b in the major axis direction by the length a in the minor axis direction) of the anti-migration particle 132 in the present embodiment is higher than the aspect ratio of the water-repellent particles 131 as illustrated in (a) of FIG. 4.

Thus, the anti-migration particles 132 move in the major axis direction less easily than the water-repellent particles 131. In order for the anti-migration particles 132 to move in the major axis direction, greater angular momentum is needed compared with the case of moving in the minor axis direction.

In general, how easy an object rotates is expressed by moment of inertia ($mr^2$). Here, m denotes the weight of the object, and r denotes the radius of the object. It is needless to say that the anti-migration particles 132 have the same weight regardless of its rotating direction. Thus, how easy the anti-migration particles 132 rotate is dependent on the radius along the rotating direction. The torque for moving in the major axis direction corresponding to a larger radius direction is larger than the torque for moving in the minor axis direction. In particular, since the anti-migration particles 132 have the axes with different aspect ratios, how easy they roll in their major axis directions diminishes.

Now, thought will be given to kinetic energy when the anti-migration particle 132 rolls. When the water-repellent particle 131 moves and collides with the anti-migration particle 132, the kinetic energy is exerted on the anti-migration particle 132 by this collision. However, since the anti-migration particle 132 does not roll easily in the major axis direction, a great amount of energy of the water-repellent particle 131 is lost by the collision, resulting in a shorter moving distance of the anti-migration particle 132.

Moreover, the water-repellent particle 131 less easily moves by climbing over the anti-migration particle 132, so that both the anti-migration particles 132 and the water-repellent particles 131 in the anti-migration layer 13b move less easily.

The water-repellent particle layer 13 moves less easily also in an intermediate layer and a bottom layer (the lower particle layer 13a), which are layers other than the surface layer (the anti-migration layer 13b). In other words, the recessed portions illustrated in FIGS. 2C to 2F are formed less easily in the anti-migration layer 13b. Thus, the desalination apparatus 10 according to the present embodiment can prevent the water-repellent particle layer 13 from being breached. Also, it is possible to prevent impurities (for example, ions) dissolved in water from passing through a portion of the water-repellent particle layer 13 whose thickness is reduced. As a result, the possibility that the liquid cannot be desalinated can be reduced.

The anti-migration particles 132 have a specific gravity as follows. More specifically, the specific gravity of the anti-migration particles 132 is greater than the specific gravity of the liquid measured when the impurity concentration is at the saturation concentration and less than or equal to the specific gravity of the water-repellent particles 131.

Since the specific gravity of the anti-migration particles 132 is greater than the specific gravity of the liquid measured when the impurity concentration is at the saturation concentration, the anti-migration particles 132 float to the liquid layer 15 less easily. Specifically, in the liquid layer 15 in the water tank, the water contained in the liquid is evaporated and turns to water vapor, resulting in a higher impurity concentration of the liquid. Here, since the specific gravity of the liquid rises with an increase in the impurity concentration, the liquid whose impurity concentration has risen by the evaporation of the water contained in the liquid sinks toward the bottom of the liquid layer 15. As a result, the impurity concentration of the liquid in the liquid layer 15 increases from the upper surface toward the lower surface. Thus, by making the specific, gravity of the anti-migration particles 132 greater than the specific gravity of the liquid measured when the impurity concentration is at the saturation concentration, the anti-migration particles 132 float to the liquid layer 15 less easily even when the impurity concentration of the liquid layer 15 rises.

On the other hand, by making the specific gravity of the anti-migration particles 132 less than or equal to the specific gravity of the water-repellent particles 131, the anti-migration particles 132 can move from and burrow under the surface layer of the water-repellent particle layer 13 less easily.

In other words, by making the specific gravity of the anti-migration particles 132 greater than the specific gravity of the liquid measured when the impurity concentration is at the saturation concentration and less than or equal to the specific gravity of the water-repellent particles 131, it becomes possible to hold the anti-migration particles 132 in the surface layer of the water-repellent particle layer 13, thus suppressing the movement of the water-repellent particles 131 further.

Here, the specific gravity of the liquid measured when the impurity concentration is at the saturation concentration is based on the kind, atmospheric pressure and temperature, etc. of the liquid, whereas the specific gravity of the water-repellent particles 131 is based on the material, etc. of the particles included in the water-repellent particles 131 and the material, etc. of the water-repellent film coating the particle surface. However, since the ratio of the mass of the water-repellent film to the mass of the water-repellent particles 131 is insignificant, the mass of water-repellent film is substantially ignorable when calculating the specific gravity of the water-repellent particles 131. For example, when the liquid is salt water, the specific gravity of saturated saline solution is about 1.2. When the water-repellent particles 131 are sand with a trade name of "Toyoura sand," the specific gravity of the water-repellent particles 131 is 2.64. Accordingly, the anti-migration particles 132 can be made of, for example, a polycarbonate resin and a polyurethane resin with a specific gravity of 1.2 a polyacetal resin with a specific gravity of 1.4, a polyethylene terephthalate (PET)

resin with a specific gravity of from 1.29 to 1.40, a hard polyvinyl chloride (PVC) resin with a specific gravity of from 1.30 to 1.58, a fluorocarbon resin with a specific gravity of from 1.77 to 2.20 or a glass material with a specific gravity of about 2.5.

Incidentally, the specific gravity of the anti-migration particles 132 may be greater than the specific gravity of the water-repellent particles 131. The anti-migration particles 132 can be made of, for example, a metallic material such as stainless steel with a specific gravity of from 7.7 to 8.0 or a ceramic material such as alumina with a specific gravity of 3.9.

Also, the anti-migration particles 132 may be hydrophilic.

This makes the anti-migration particles 132 even less easily movable, and suppresses the decrease in desalination efficiency.

More specifically, if the anti-migration particles 132 are water-repellent, the surfaces of the anti-migration particles 132 do not get wet with the liquid, so that the anti-migration particles 132 do not interact with the surrounding water-repellent particles 131 and anti-migration particles 132 via water, and thus move easily. Accordingly, when the liquid is introduced to the water tank 11, the anti-migration particles 132 are stirred up easily. On the other hand, if the anti-migration particles 132 are hydrophilic, the surfaces of the anti-migration particles 132 get wet with the liquid. Thus, the anti-migration particles 132 interact with the surrounding water-repellent particles 131 and anti-migration particles 132 via water, whereby their movement are suppressed.

Also, if the anti-migration particles 132 are water-repellent, the surfaces of the anti-migration particles 132 do not get wet with the liquid. Thus, no liquid reaches the surfaces of the water-repellent particles 131 that are coated, namely, covered with the anti-migration particles 132. Accordingly, in a plan view of the water-repellent particle layer 13, the area of a region formed of the water-repellent particles 131 with a surface that the liquid has reached is reduced with respect to the area of the water-repellent particle layer 13. Consequently, there is a possibility that the desalination efficiency of the desalination apparatus 10 may decrease. In contrast, if the anti-migration particles 132 are hydrophilic, the liquid wets and spreads over the surfaces of the anti-migration particles 132. Thus, the liquid reaches the surfaces of the water-repellent particles 131 located immediately below the anti-migration particles 132. Accordingly, in a plan view of the water-repellent particle layer 13, the area of a region formed of the water-repellent particles 131 with a surface that the liquid has reached is substantially the same as the area of the water-repellent particle layer 13. Consequently, it is possible to suppress the decrease in the desalination efficiency of the desalination apparatus 10.

As described above, the anti-migration particles 132 are hydrophilic, so that the anti-migration particles 132 move even less easily and the decrease in the desalination efficiency of the desalination apparatus 10 can be suppressed.

Incidentally, the anti-migration particles 132 may be water-repellent instead of hydrophilic. This makes it possible to prevent the liquid from entering the inside of the water-repellent particle layer 13 even when the height of the anti-migration particles 132 becomes higher than the thickness of the water-repellent particle layer 13. In other words, if the anti-migration particles 132 are hydrophilic, the liquid wets and spreads over the surfaces of the anti-migration particles 132 and may possibly enter the inside of the water-repellent particle layer 13. Accordingly, the water-repellent particle layer 13 is sometimes breached at the portion where the liquid enters. In contrast, if the anti-migration particles 132 are water-repellent, it is possible to prevent the liquid from entering the inside of the water-repellent particle layer 13.

Also, when the anti-migration layer 13b in which the anti-migration particles 132 and the water-repellent particles 131 are mixed is seen in a plan view from above, the anti-migration particles 132 may occupy 10% to 50% per unit area of the anti-migration layer 13b.

This suppresses both the decrease in desalination efficiency and the movement of the water-repellent particles 131 in a sufficient manner. More specifically, even if the anti-migration particles 132 are caused to occupy higher than 50% per unit area of the anti-migration layer 13b, it is not expected that the movement of the water-repellent particles 131 will be suppressed further. Moreover, a decrease in the area of an interface between the liquid and the water-repellent particles 131 may reduce the desalination efficiency. On the other hand, if the anti-migration particles 132 are caused to occupy less than 10% per unit area of the anti-migration layer 13b, it will become difficult to suppress the movement of the water-repellent particles 131 sufficiently. Thus, the anti-migration particles 132 are caused to occupy 10% to 50% per unit area of the anti-migration layer 13b when the anti-migration layer 13b is seen in the plan view from above, making it possible to suppress both the decrease in desalination efficiency and the movement of the water-repellent particles 131 in a sufficient manner.

Also, the length of each of the plurality of anti-migration particles 132 in the minor axis direction may be greater than an average particle size of the plurality of water-repellent particles 131. This makes it possible to prevent the water-repellent particles 131 from moving by climbing over the anti-migration particles 132. Furthermore, by taking out at least a part of the water-repellent particle layer 13 including the anti-migration layer 13b and passing it through a sieve, it is possible to easily separate the water-repellent particles 131 and the anti-migration particles 132 contained in the water-repellent particle layer 13 that has been taken out. For example, when the impurity concentration of the liquid layer 15 in the water tank exceeds the saturation concentration and the impurities are deposited on the water-repellent particle layer 13, the deposited impurities may lower the desalination efficiency of the desalination apparatus. Accordingly, when the impurities are deposited, at least a part of the water-repellent particle layer 13 including the anti-migration layer 13b is taken out, and then the deposited impurities are rinsed out, followed by passing the part through the sieve. This makes it possible to easily separate the water-repellent particles 131 and the anti-migration particles 132 from which the impurities are rinsed out. Thus separated water-repellent particles 131 and anti-migration particles 132 are put back in the desalination apparatus, whereby the decrease in desalination efficiency of the desalination apparatus can be suppressed.

As described above, with the desalination apparatus 10 according to an embodiment of the present disclosure, the water-repellent particle layer 13 includes the anti-migration layer 13b provided as the surface layer that faces the water tank 11 (the reservoir layer) and containing the plurality of anti-migration particles 132. Each of the plurality of anti-migration particles 132 has an aspect ratio, which is a value obtained by dividing the length in the major axis direction by the length in the minor axis direction, higher than the water-repellent particles 131.

Since the aspect ratio of the anti-migration particles 132 is higher than the aspect ratio of the water-repellent particles 131 as described above, the anti-migration particles 132 move less easily than the water-repellent particles 131. Also, the anti-migration particles 132 serve as the obstacle to easy movement of the water-repellent particles 131. As a result, the anti-migration layer 13b, namely, the surface layer of the water-repellent particle layer 13 is not eroded easily. In other words, no recessed portion is formed easily in the water-repellent particle layer 13. Unless the recessed portion is formed, it is possible to prevent the water-repellent particles 131 located inside the water-repellent particle layer 13 (in the lower particle layer 13a) from being stirred up in the liquid layer 15. This can prevent the water-repellent particle layer 13 from being breached.

Incidentally, the length of each of the plurality of anti-migration particles 132 in the minor axis direction may be less than or equal to the average particle size of the plurality of water-repellent particles 131.

Also, the shape of the anti-migration particles 132 is not limited to the spheroidal (prolate) shape illustrated in FIG. 4 but may be, for example, a prismatic shape, a pyramidal shape, a conical shape or the like.

Alternatively, in the plan view, the anti-migration particles 132 may occupy higher than 50% and may occupy, for example, 100% per unit area of the anti-migration layer 13b. In other words, the anti-migration layer 13b may contain no water-repellent particle 131 and be formed of the plurality of anti-migration particles 132 that are clustered together. In this case, although the desalination efficiency may be lower than that in the above-described embodiment, the anti-migration particles 132 do not move easily similarly to the embodiment, so that the anti-migration layer 13b, namely, the surface layer of the water-repellent particle layer 13 is not eroded easily. This can prevent the water-repellent particle layer 13 from being breached.

Figure 6:
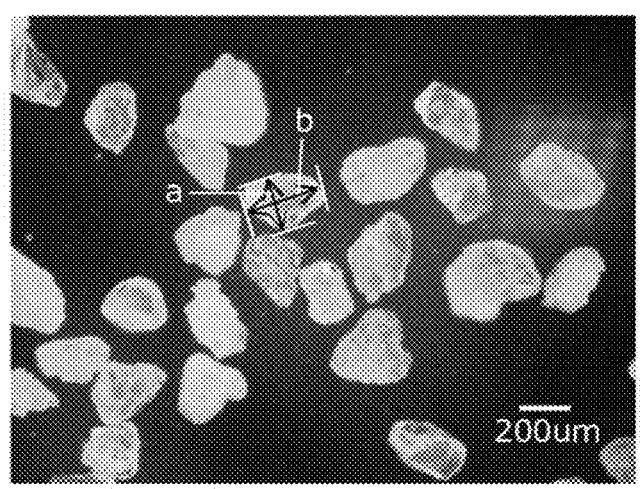
FIG. 6 is an optical microscope photograph illustrating a configuration of exemplary sand used as the water-repellent particles.

Furthermore, although the aspect ratio of the water-repellent particles 131 is one in the embodiment described above, it is not limited to one, FIG. 6 is an optical microscope photograph of sand having a trade name of "Toyoura sand" used as the water-repellent particles 131. As can be seen from this figure, the water-repellent particles 131 having an aspect ratio b/a of up to about two seem to be present. Thus, the aspect ratio of the anti-migration particles 132 may be set to three or more. This makes it possible to suppress the movement of the anti-migration particles 132 more reliably, so that the movement of the individual water-repellent particles 131 in the anti-migration layer 13b can be suppressed more reliably. This can sufficiently prevent the water-repellent particle layer 13 from being breached.

Additionally, the anti-migration particles 132 may have a structure promoting heat collection, and may be black in color, for example.

[Desalination System]

The desalination apparatus configured as above can be implemented not only as a device but also as a system. Hereinafter, an example of the desalination system in the present embodiment will be described with reference to FIG. 7.

Figure 7:
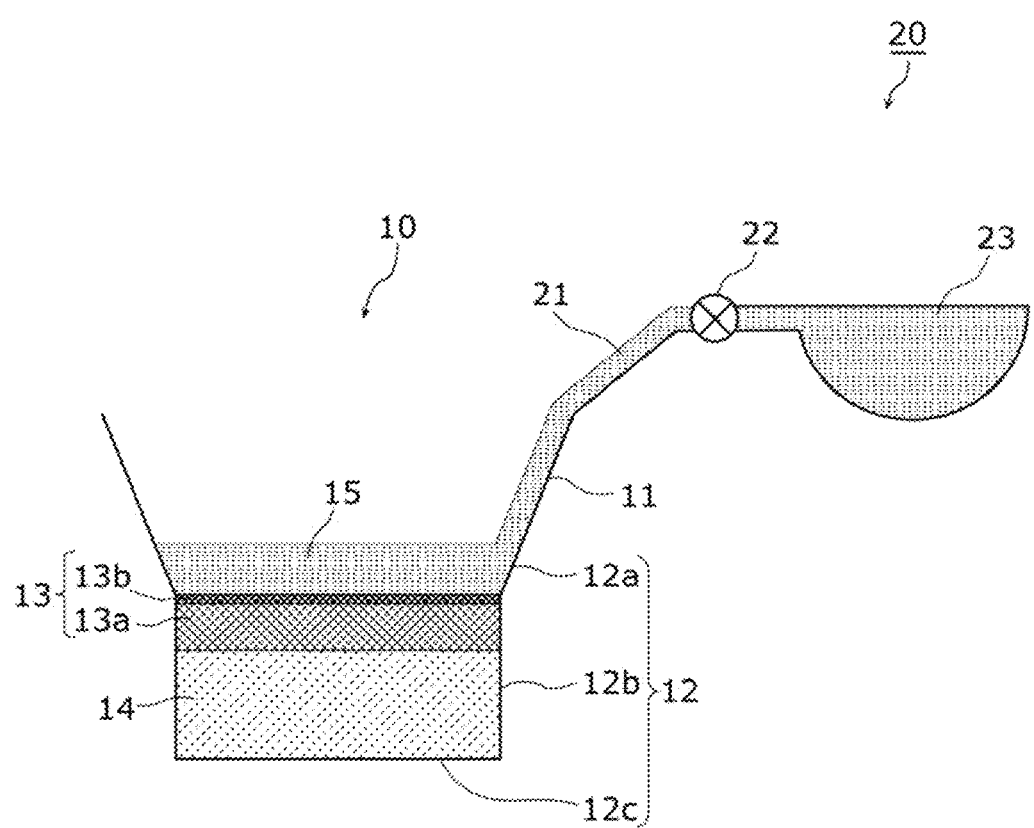
FIG. 7 is an example of a sectional view illustrating a configuration of the desalination system.

FIG. 7 is an example of a sectional view illustrating a configuration of the desalination system in the present embodiment.

A desalination system 20 illustrated in FIG. 7 is, for example, a system that obtains fresh water from seawater, and includes the desalination apparatus 10 according to the first embodiment and a sluice gate 22. Structural elements similar to those in FIG. 3 are assigned the same reference signs, and the detailed description thereof will be omitted.

The sluice gate 22 is opened and closed so that the introduction of the liquid from the outside of the desalination apparatus 10 to the water tank 11 is started and stopped, respectively. More specifically, the sluice gate 22 is provided in an introduction passage 21, and regulates the amount of the liquid to be introduced to the water tank 11 (the introduction amount) via the introduction passage 21.

In an example illustrated by FIG. 7, the sluice gate 22 regulates the amount of flow of the liquid between the water tank 11 and an external tank 23 in which the liquid is stored. When the sluice gate 22 is opened, the liquid is introduced from the external tank 23 via the introduction passage 21 to the water tank 11. When the sluice gate 22 is closed, the introduction of the liquid from the external tank 23 via the introduction passage 21 to the water tank 11 is stopped. It should be noted that the opening and closing of the sluice gate 22 may be, for example, operated by a user or the like or, for example, controlled by a sluice gate control unit, or the like. The external tank 23 is, for example, the sea, a pretreatment tank that stores seawater introduced from the sea, or a tank that stores salt water supplied separately.

The desalination system 20 configured as above has the anti-migration layer 13b that suppresses the movement of the water-repellent particles, and thus can prevent the water-repellent particle layer 13 from being breached. Consequently, the problem of desalination being impossible can be alleviated.

[Desalination Method]

The following description will be directed to a desalination process carried out by the desalination system 20 according to the present embodiment.

<Desalination Process>

Figure 8:
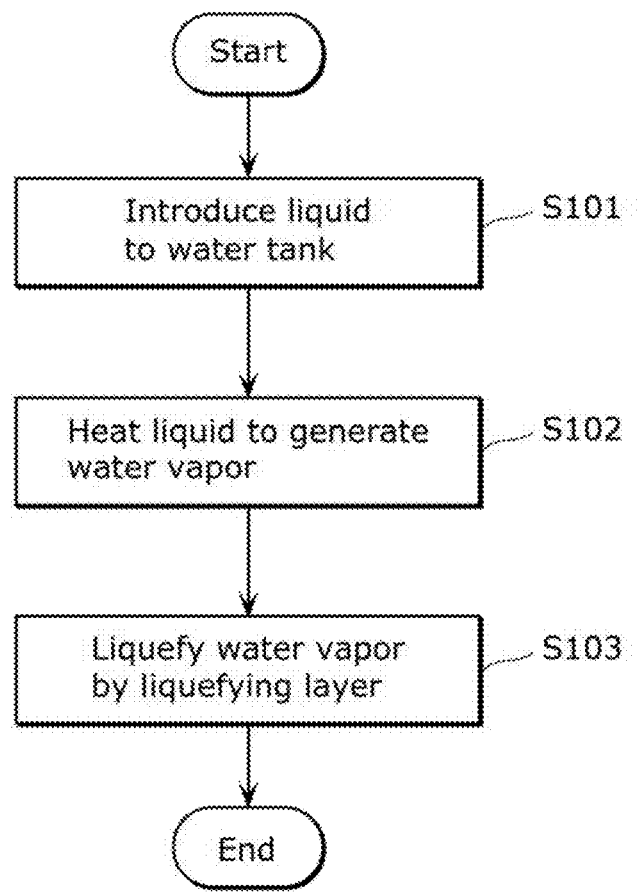
FIG. 8 is a flowchart illustrating steps of a desalination process.

FIG. 8 is a flowchart illustrating steps of the desalination process of the desalination system 20. It should be noted that the desalination process described in the following is not limited to the desalination process of the desalination system 20 but may be a desalination process of the desalination apparatus according to the embodiment, or a variation of the embodiment.

First, the liquid is introduced to the water tank 11, and placed above the water-repellent particle layer 13 (to serve as the liquid layer 15) (S101). Here, the liquid is, for example, salt water.

Incidentally, when the desalination process is carried out in the desalination system 20 shown in FIG. 7, the liquid is poured from the external tank 23 via the sluice gate 22 and the introduction passage 21 into the water tank 11, thus forming the liquid layer 15 on the upper surface of the water-repellent particle layer 13.

Next, by heating and evaporating the liquid placed above the water-repellent particle layer 13, the water vapor is generated (S102). More specifically, when the liquid stored in the water tank 11 (the liquid layer 15) is heated to a temperature higher than or equal to a certain temperature, the liquid turns to the water vapor.

Incidentally, the above-noted certain temperature is determined according to a saturation vapor pressure curve based on the kind of the liquid and atmospheric pressure. For example, when the liquid is salt water, the certain temperature is from 50° C. to 60° C. The liquid layer 15 may be heated, for example, by sunlight or by a heater if the water tank 11 includes the heater. Alternatively, the liquid layer 15 may be heated by supplying a heated object into the liquid layer 15 in the water tank 11.

Subsequently, the water vapor is liquefied by the liquefying layer 14, thereby obtaining the fresh water (S103).

More specifically, the water vapor obtained by heating and evaporating the liquid in the water tank 11 moves not only upward but also downward. When the water vapor moving downward passes through the gap between the water-repellent particles in the water-repellent particle layer 13 and reaches the liquefying layer 14, it is liquefied by the liquefying layer 14 to become liquid water. In other words, the water vapor obtained by heating and evaporating the liquid in the water tank 11 is cooled in the liquefying layer 14 to become liquid water.

In this manner, the desalination process of the desalination system 20 is performed.

It should be noted that the liquid water is water in which solids contained in the liquid that has been poured into the water tank 11 and impurities dissolved therein are reduced, and typically fresh water (distilled water). The impurities dissolved in the liquid are, for example, ions.

(Variation)

Although the example of the desalination system has been described with reference to FIG. 7 in the embodiment described above, the desalination system is not limited to the example illustrated in FIG. 7. Another example of the desalination system will be described as a variation.

Figure 9:
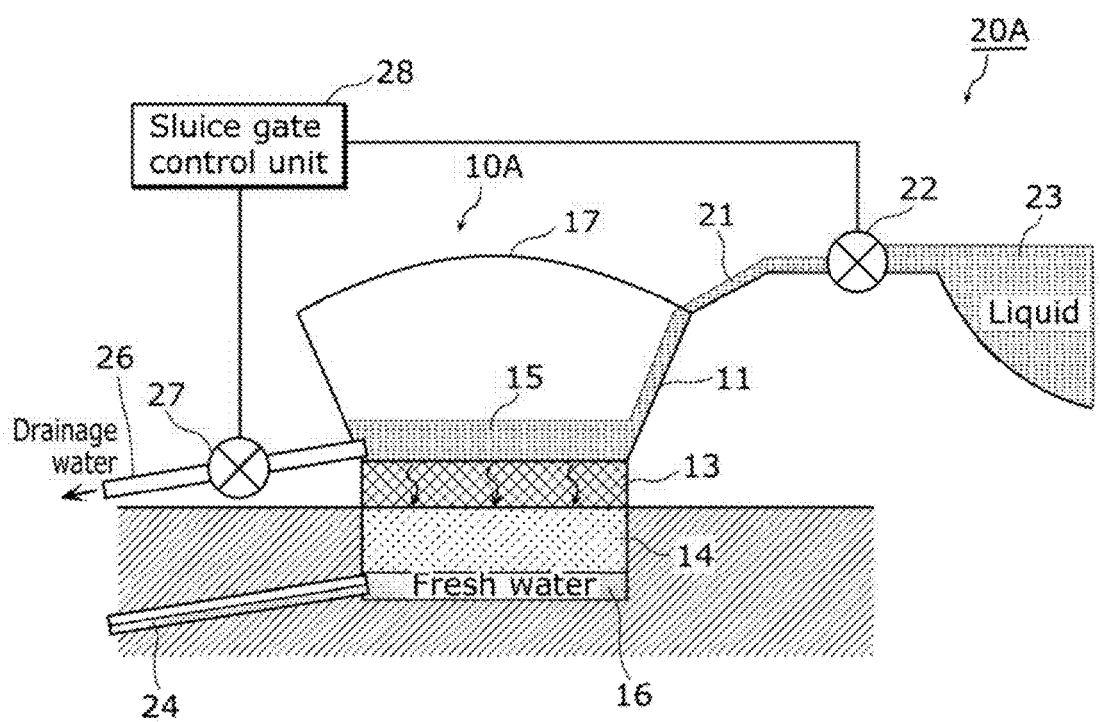
FIG. 9 is an example of a sectional view illustrating a configuration of a desalination system in a variation of an embodiment.

FIG. 9 is an example of a sectional view illustrating a configuration of the desalination system in a variation of an embodiment.

A desalination system 20A illustrated in FIG. 9 obtains fresh water from seawater, for example, and includes a desalination apparatus 10A, an introduction passage 21, a sluice gate 22, an external tank 23, a fresh water passage 24, a discharge pipe 26, a discharge valve 27 and a sluice gate control unit 28, Structural elements similar to those in FIG. 7 are assigned the same reference signs, and the detailed description thereof will be omitted.

The desalination apparatus 10A includes a lid 17 unlike the desalination apparatus 10 illustrated in FIG. 7. Since other configurations are similar to those of the desalination apparatus 10, the description thereof will be omitted.

The lid 17 is provided in the water tank 11, and covers an opening of the water tank 11 (the upper side wall 12a). The lid 17 is formed of a transparent member when the liquid layer 15 of the desalination apparatus 10A is heated by sunlight. The desalination apparatus 10A includes the lid 17, whereby it is possible to not only reduce the water vapor upwardly escaping from the water tank 11 but also reduce the impurities entering through the opening of the water tank 11.

The fresh water passage 24 is connected with the liquefying layer 14, and discharges the fresh water (distilled water) from the liquefying layer 14 to the outside. Incidentally, the fresh water passage 24 may be provided with a fresh water discharge valve (not shown). In that case, the fresh water discharge valve is opened so as to discharge fresh water (distilled water) from the liquefying layer 14 via the fresh water passage 24 to the outside, whereas the fresh water discharge valve is closed so as to stop discharging the fresh water (distilled water) from the liquefying layer 14. It should be noted that the opening and closing of the fresh water discharge valve may be controlled by the sluice gate control unit 28.

The discharge pipe 26 is connected with the water tank 11, and discharges the liquid from the liquid layer 15 to the outside.

The discharge valve 27 is provided in the discharge pipe 26. The discharge valve 27 is opened so as to discharge the liquid from the liquid layer 15 in the water tank 11, and closed so as to stop discharging the liquid from the liquid layer 15 in the water tank 11. The opening and closing of the discharge valve 27 are controlled by the sluice gate control unit 28.

The sluice gate control unit 28 may control the opening and closing of the sluice gate 22, the discharge valve 27 and so on according to information inputted by a user or the like utilizing an input unit (not shown). Here, the input unit is, for example, a touch panel, a keyboard, a cursor, a microphone or the like. Also, the information to be inputted to the input unit by the user or the like is, for example, information indicating an instruction to open the sluice gate 22 or information indicating an instruction to close the sluice gate 22.

Figure 10:
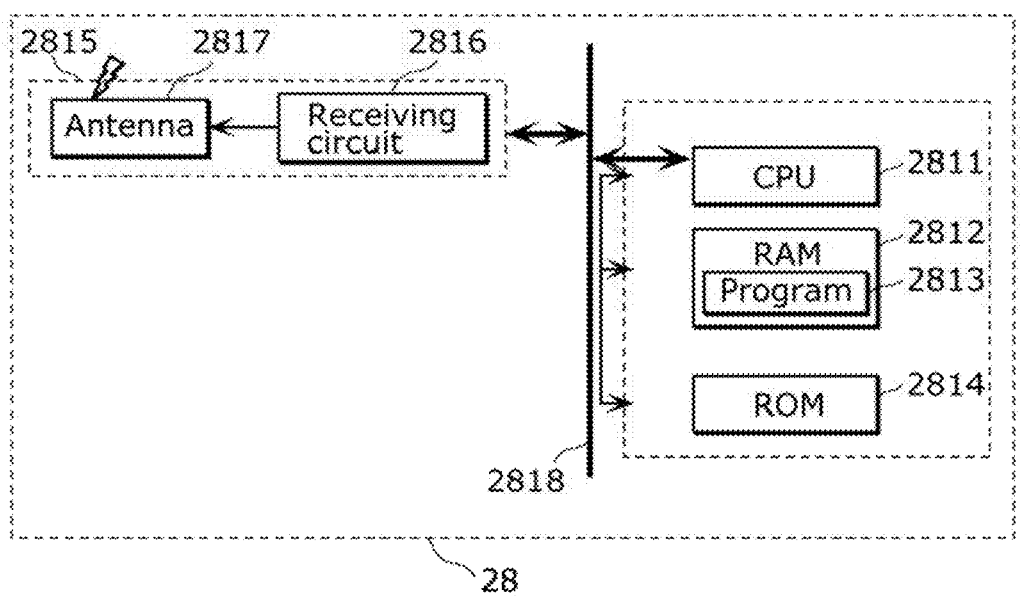
FIG. 10 is a block diagram illustrating an example of a hardware configuration of a sluice gate control unit.

FIG. 10 is a block diagram illustrating an example of a hardware configuration of the sluice gate control unit 28 in a variation of the e embodiment.

As shown in FIG. 10, the sluice gate control unit 28 includes, for example, a CPU 2811, a RAM 2812, a ROM 2814, a receiving unit 2815 and a bus 2818.

The CPU 2811 executes a program 2813 stored in the RAM 2812. In the program 2813, procedures in FIG. 8 explained above are described, for example. It is noted that the program 2813 may be stored in the ROM 2814.

The receiving unit 2815 includes an antenna 2817 and a receiving circuit 2816, and receives information indicating opening/closing of the sluice gate, etc. For example, when the user or the like inputs the information to the input unit, the information is transmitted from the antenna 2817 provided in the input unit. In that case, in the sluice gate control unit 28, the transmitted information is received by the antenna 2817 and accepted by the receiving circuit 2816.

The receiving circuit 2816 and the CPU 2811 are connected to each other via the bus 2818, and can mutually transfer data. The information accepted by the receiving unit 2815, namely, the receiving circuit 2816 is transmitted to the CPU 2811 via the bus 2818.

In the desalination system 20A configured as above, it is possible to regulate the amount of water to be introduced (flow of water). Thus, the breach of the water-repellent particle layer 13 caused by the water flow can be suppressed.

Although the desalination apparatus and the desalination method according to one or more aspects have been described based on the embodiment and variation, the present disclosure is not limited to these embodiment and variation. As long as not departing from the purport of the present disclosure, many variations of the above embodiment and variation conceivable by a person skilled in the art and modes configured by the combination of the structural components in different embodiments and variations may be included in the scope of one or more aspects of the present disclosure.

The herein disclosed subject matter is to be considered descriptive and illustrative only, and the appended Claims are of a scope intended to cover and encompass not, only the particular embodiment disclosed, but also equivalent structures, methods, and/or uses.

INDUSTRIAL APPLICABILITY

The desalination apparatus and the desalination method according to one or more exemplary embodiments disclosed herein are applicable to an apparatus or a system that desalinate a liquid.

The invention claimed is:

1. A desalination apparatus that obtains fresh water from a liquid, the desalination apparatus comprising:
   a tank for storing a liquid in a reservoir layer;

a water-repellent particle layer that is located at a bottom portion of the tank, the water repellent particle layer including a plurality of water-repellent particles that allow passage of water vapor generated by evaporation of the liquid stored in the reservoir layer, wherein each of the water-repellent particles includes a particle and a water-repellent film that coats the surface of the particle; and a plurality of particles forming a liquefying layer that is located below the water-repellent particle layer, and liquefies the water vapor that has passed through the water-repellent particle layer to obtain the fresh water, wherein the water-repellent particle layer includes an anti-migration layer provided as a surface layer that faces the reservoir layer and containing a plurality of anti-migration particles, and each of the plurality of anti-migration particles has a higher aspect ratio than the plurality of water-repellent particles, the aspect ratio being a value obtained by dividing a length in a major axis direction by a length in a minor axis direction.

2. The desalination apparatus according to claim 1,
wherein the liquid contains water and impurities dissolved in the water, and a specific gravity of each of the plurality of anti-migration particles is greater than a specific gravity of the liquid measured when a concentration of the impurities in the liquid is at a saturation concentration, and less than or equal to a specific gravity of the plurality of water-repellent particles.

3. The desalination apparatus according to claim 1, wherein each of the plurality of anti-migration particles is hydrophilic.

4. The desalination apparatus according to claim 1, wherein, in a plan view, the plurality of anti-migration particles occupy 10% to 50% per unit area of the anti-migration layer.

5. The desalination apparatus according to claim 1, wherein the length of each of the plurality of anti-migration particles in the minor axis direction is greater than an average particle size of the plurality of water-repellent particles.

6. A desalination method for obtaining fresh water from a liquid using a desalination apparatus, which is the desalination apparatus according to claim 1, wherein the desalination apparatus includes a lid provided on an opening of the tank, the desalination method comprising:

introducing the liquid to the reservoir layer to place the liquid above the water-repellent particle layer;

heating and evaporating the liquid placed above the water-repellent particle layer to generate water vapor; and liquefying the water vapor by the liquefying layer to obtain the fresh water.

7. A desalination method for obtaining fresh water from a liquid using a desalination apparatus, which is the desalination apparatus according to claim 1, the desalination method comprising:

introducing the liquid to the reservoir layer to place the liquid above the water-repellent particle layer; and heating and evaporating the liquid placed above the water-repellent particle layer to generate water vapor.

\* \* \* \* \*